United States Patent
George et al.

(10) Patent No.: US 6,851,743 B2
(45) Date of Patent: Feb. 8, 2005

(54) SLIDE MECHANISM FOR DOOR AND STRUCTURAL MEMBER ASSEMBLY

(75) Inventors: Michael George, Bridgeport, CT (US); James A. O'Brien, II, LaSalle, MI (US)

(73) Assignee: Toto Tech, Inc., Batavia, IL (US)

( * ) Notice: Subject to any disclaimer, the term of this patent is extended or adjusted under 35 U.S.C. 154(b) by 72 days.

(21) Appl. No.: 10/427,257

(22) Filed: May 1, 2003

(65) Prior Publication Data

US 2003/0204998 A1 Nov. 6, 2003

Related U.S. Application Data (60) Provisional application No. 60/376,952, filed on May 1, 2002.

(51) Int. Cl.[7] .................................................. B60J 5/04
(52) U.S. Cl. .................. 296/202; 296/155; 296/146.11; 49/223; 49/258; 49/260
(58) Field of Search ........................... 296/202, 146.11, 296/155; 49/212, 221, 223, 176, 177, 254, 258, 260

(56) References Cited

U.S. PATENT DOCUMENTS

| | | | | |
|---|---|---|---|---|
| 1,869,274 A | * | 7/1932 | Phillips | 49/365 |
| 4,135,760 A | * | 1/1979 | Grossbach | 296/155 |
| 5,398,988 A | * | 3/1995 | DeRees et al. | 296/155 |
| 6,328,374 B1 | | 12/2001 | Patel | |
| 6,385,910 B1 | | 5/2002 | Smink et al. | |

* cited by examiner

*Primary Examiner*—Dennis H. Pedder
(74) *Attorney, Agent, or Firm*—MacMillan, Sobanski & Todd, LLC (57) ABSTRACT

An apparatus for.

A slide mechanism for a door and structural member assembly, the slide mechanism including a frame, a door carrier movably secured to the frame, a door and structural member such as a B-pillar at least partially supported by the door carrier, a slide mechanism that permits the B-pillar and the door to be moved along the door carrier without detaching from the vehicle frame.

17 Claims, 6 Drawing Sheets

SLIDE MECHANISM FOR DOOR AND STRUCTURAL MEMBER ASSEMBLY

CROSS-REFERENCE TO RELATED APPLICATION

This application claims the benefit of U.S. provisional patent application Ser. No. 60/376,952 filed May 1, 2002.

BACKGROUND OF THE INVENTION

The present invention relates generally to doors and mechanisms for swinging and sliding doors relative to a door opening.

Most doors are mounted in door openings by two or more hinges along one side edge for swinging (pivotal) movement about a vertical axis between closed and open positions relative to an access opening in the door frame. For doors associated with buildings, the swing arc is only limited by the wall surface surrounding the door frame such that the door can be opened so as to expose the entire access opening. However, sometimes it is desirable to mount a door on tracks for sliding movement generally parallel to a plane of the door access opening. For example, many vehicles such as panel trucks and vans have at least one side door mounted for sliding movement along an outer side surface of the vehicle. Such a door is typically slidably connected to an upper track located at an upper edge of the door frame access opening near the vehicle roof, a lower track located at a lower edge of the door frame access opening near the sill area, and a center track located in the vehicle side wall near a rear edge of the door frame access opening.

SUMMARY OF THE INVENTION

The present invention concerns an apparatus for operation.

The invention relates to a door and structural member assembly, including at least one door positioned within a frame assembly, and the door partially supports the structural member. When the door assembly is in the normally closed position (e.g., the first position) the door and structural member perform their ordinary functions of providing a standard sized access opening in the frame and providing structural support for the vehicle body and frame. When it is desirable to create an access opening in the frame larger than the standard size opening created by the door alone, the door and structural member are slid as a unit out of the existing access opening, creating an enlarged access opening unobstructed by the door and the structural member.

The invention also relates to a slide mechanism for permitting the door and a structural member assembly to slide along the frame assembly from a first position to a second position without detaching the assembly from the frame. The slide mechanism includes a door carrier movably secured to a frame; a door at least partially supported by the door carrier, wherein the door can be positioned in an open or closed position or any position intermediate between open and closed; a movable structural member having a portion thereof supported by the door and a portion thereof supported by the door carrier, means for securing the structural member in position in the frame when the door is in the closed position; and means supported by the frame for positioning the door carrier in a slide position, whereby the door and structural member can be slid along the door carrier from a first position to a second position.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
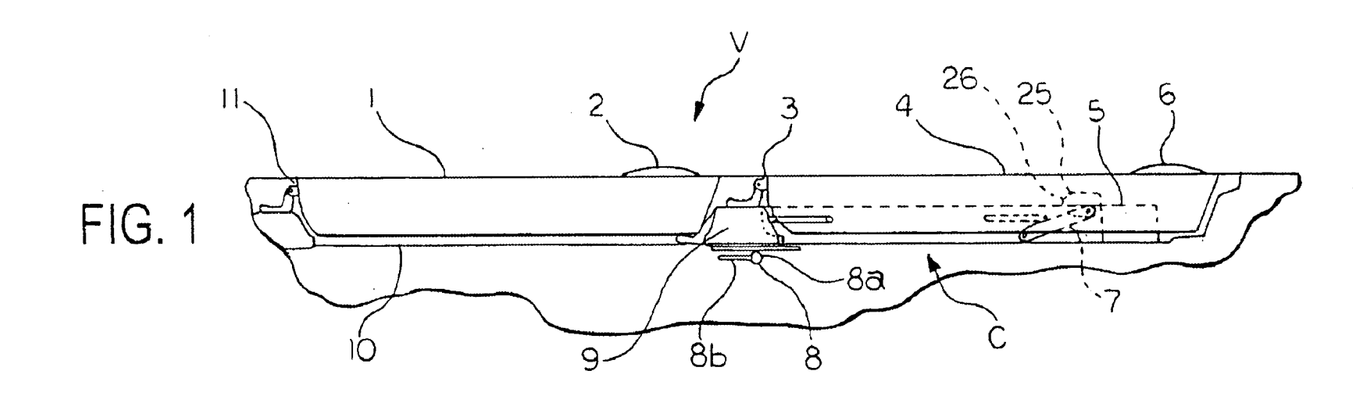
FIG. 1 is a fragmentary top plan view showing a slide door and structural assembly with a slide mechanism in accordance with the present invention installed in a four-door vehicle.
Figure 2:
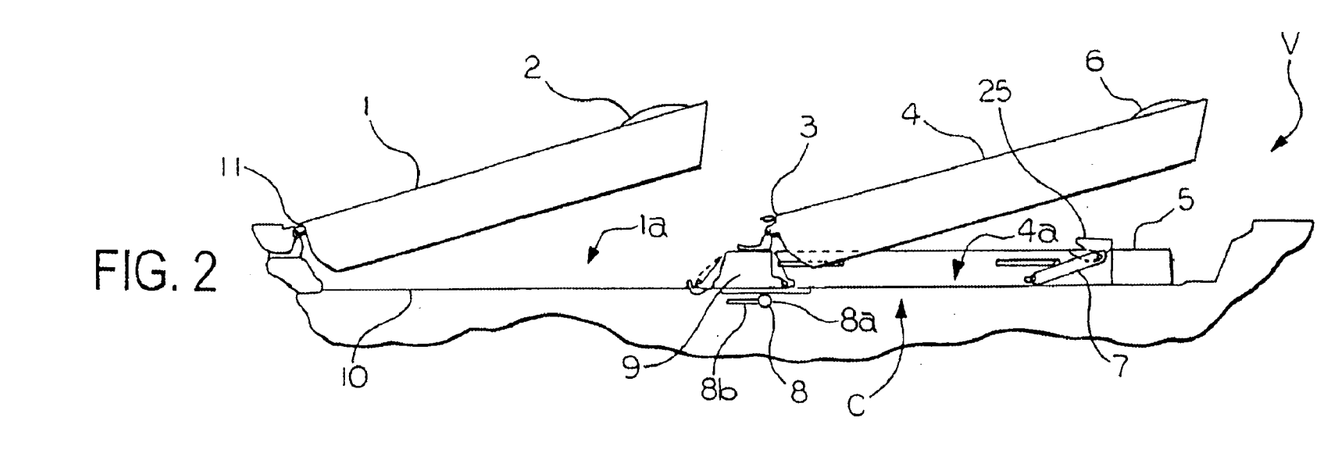
FIG. 2 is a view similar to FIG. 1 wherein a swing door and the slide door are pivotally opened in a standard mode.
Figure 3:
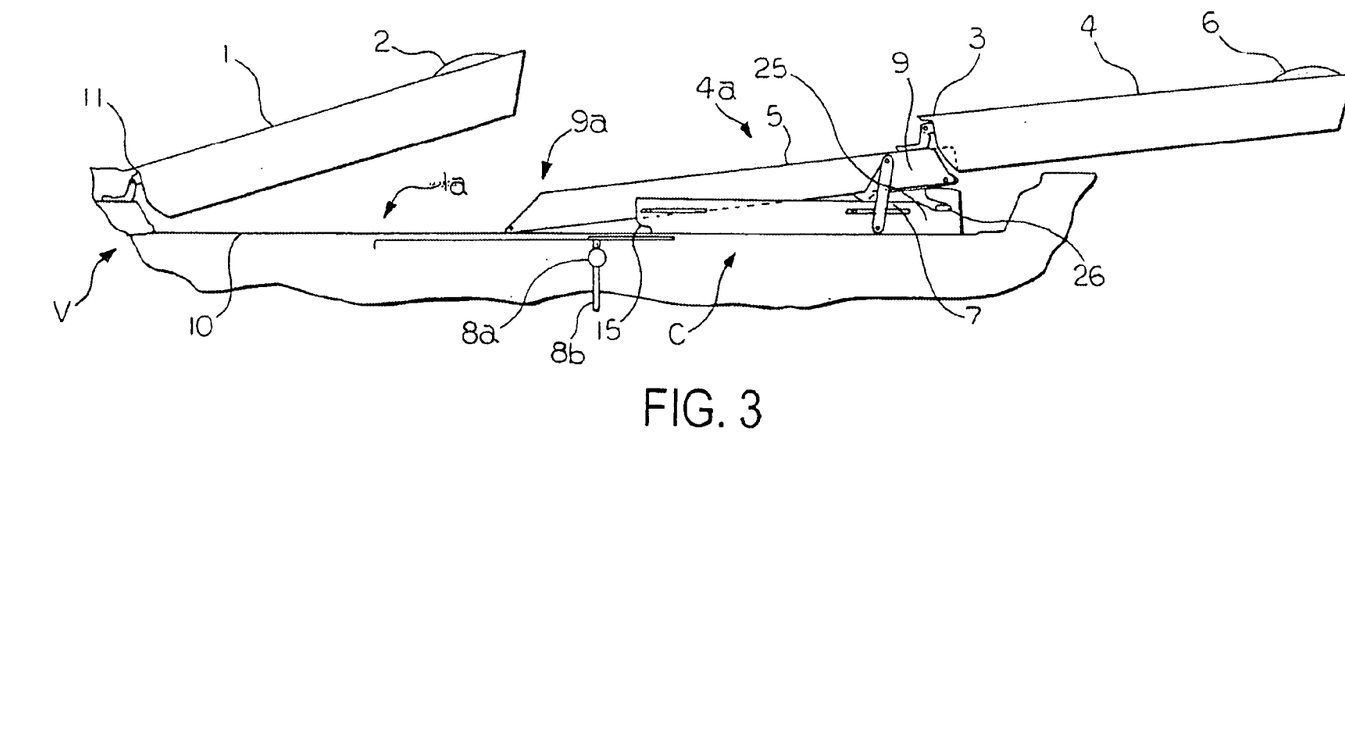
FIG. 3 is a view similar to FIG. 1 wherein the slide door and the associated structural member are moved in the direction of the rear of the vehicle in order to increase the size of the standard access opening formed in the vehicle.

The FIGS. 1–7 illustrate one embodiment of the present invention that shall be used for illustrative purposes, and is not intended in any way to limit the scope of the invention. FIG. 1 is a fragmentary top plan view of a portion of one side of a four-door vehicle V, such as an automobile having a door frame 10. The term door frame is used herein to describe that portion of a vehicle unibody surrounding a door opening generally formed in a side or rear surface of the vehicle. For vehicles having a separate body attached to a supporting frame, the door frame can include portions of the body and the frame. Installed within the door frame 10 are a standard swing door 1 for access to a front seat portion of the automobile and a slide door 4 for access to a rear seat portion of the automobile. In FIG. 1, the doors 1 and 4 are closed and in FIG. 2, the doors are partially open. As shown in FIG. 2, the swing door 1 includes a conventional swing handle 2. By pulling upwardly (or outwardly depending upon the construction) on the swing handle 2, the swing door 1 is unlatched at a rear edge thereof and can be opened in a standard fashion by rotating the door about a side hinge 11 attached between a front edge of the door and the door frame 10, as best seen in FIGS. 2 and 3. Similarly, the slide door 4 includes a swing handle 6. Again, by pulling upwardly, or outwardly, on the swing handle 6, the slide door 4 can be unlatched and opened in a standard fashion by rotating the slide door 4 about a center hinge 3 attached between a front edge of the door and the door frame 10. It will be appreciated that the swing handles 2 and 6 can be any type of known vehicle door handle.

FIG. 2 shows both of the doors 1 and 4 in a standard partially swung open position. It will be appreciated that the doors 1 and 4 can be opened and closed independently of one another between the closed positions shown in FIG. 1 and fully opened positions (not shown) which is a first or standard mode of operation of the doors. When either of the doors 1 and 4 is opened, an associated access opening defined by the door frame 10 is exposed which openings are approximately the size of the respective door. Front and rear access openings 1*a* and 4*a*, associated with the doors 1 and 4 respectively, are separated by a structural member such as a center pillar 9, which in the disclosed embodiment is preferably the B-pillar in an automobile system. The pillar 9 extends vertically between a rear edge of the door 1 and a front edge of the door 4 and is part of the door frame 10 defining an edge of each of the openings 1*a* and 4*a*. The pillar 9 is releasably attached at upper and lower ends to the remainder of the door frame 10. As shown in FIG. 3, a slide mechanism C according to the present invention permits both the pillar 9 and the slide door 4 to be repositioned along the door frame 10 in a second mode of operation creating a larger side opening in the vehicle V including the access openings 1*a* and 4*a* and an area 9*a* normally occupied by the pillar 9.

Figure 4:
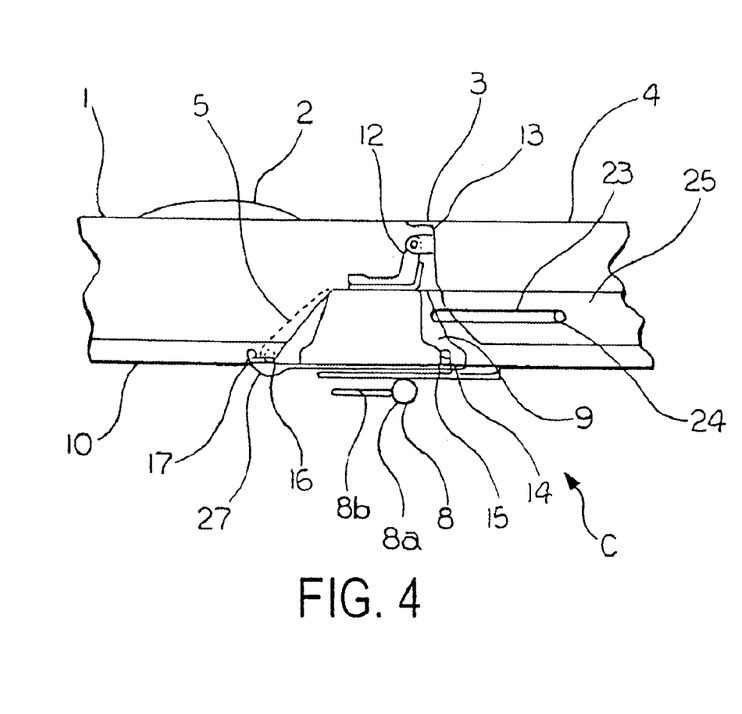
FIG. 4 is an enlarged view of a central portion of FIG. 1 showing the slide door, the structural member assembly and a forward part of the slide mechanism.
Figure 5:
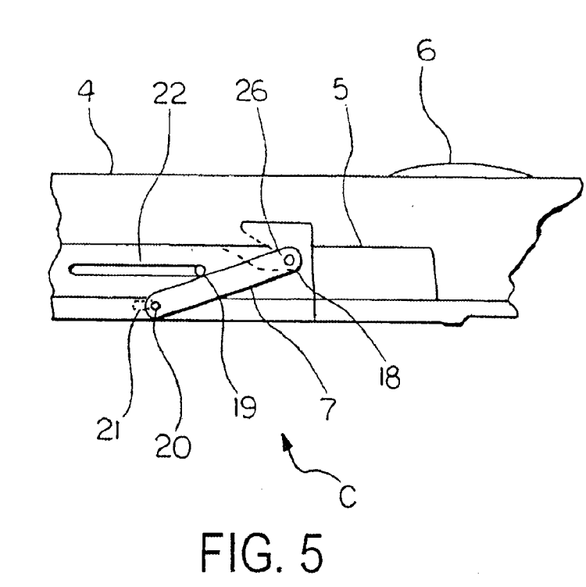
FIG. 5 is an enlarged view of a rearward portion of FIG. 1 showing a latching system that forms a rearward part of the slide mechanism.
Figure 6:
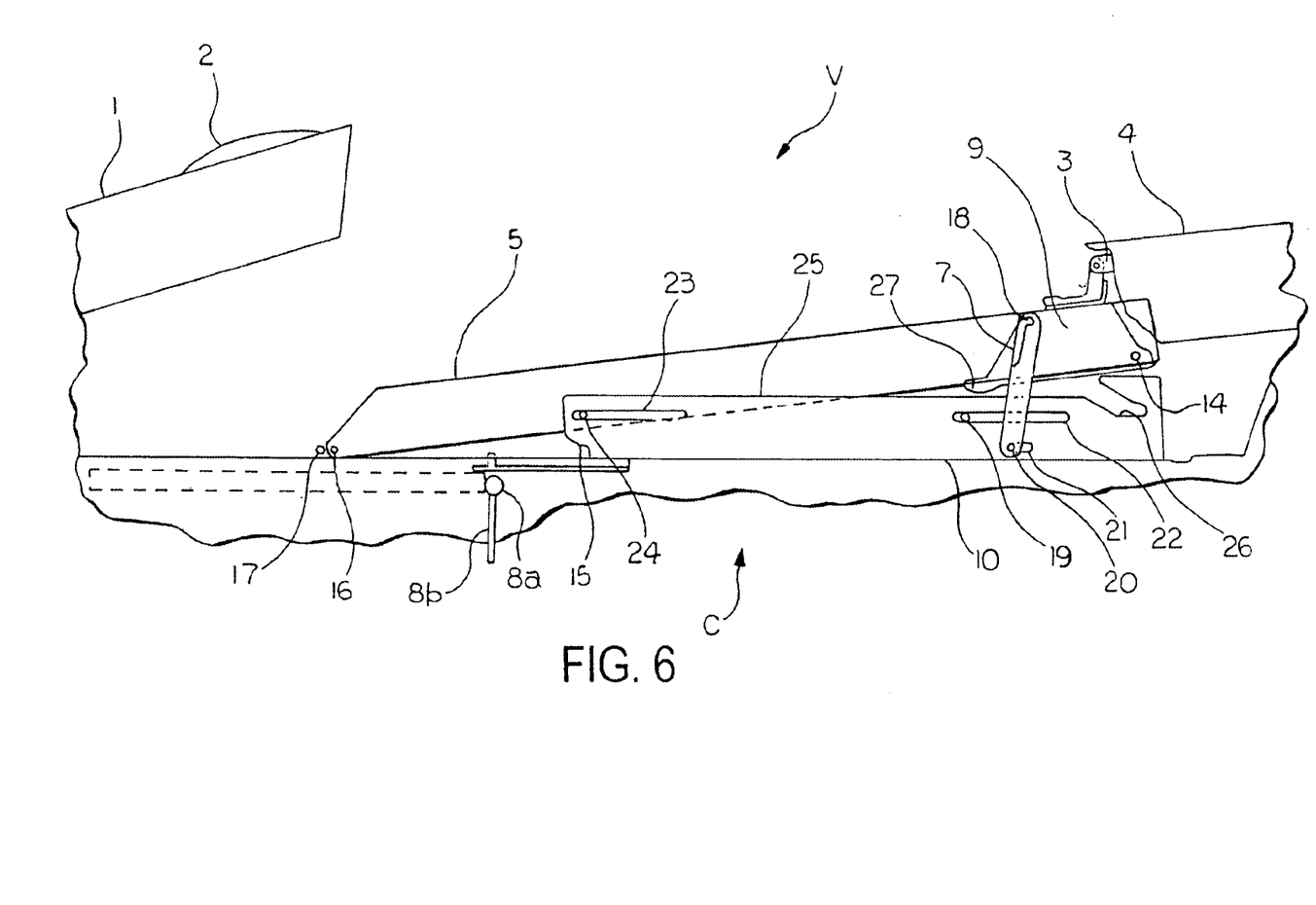
FIG. 6 is an enlarged view of a portion of FIG. 3 wherein the slide door and the structural member are moved to the fully extended position.

As shown in FIGS. 4 and 5, the slide mechanism C preferably includes a door carrier 5, a slide lever 8, a catch slide 25 and a pitch pole assembly 7. As best seen in FIG. 6, the door carrier 5 is coupled to the door frame 10 at the front end by a pivot door carrier 16 to pivot outwardly from the access opening 4*a* and provide a support surface along which the slide door 4 slides during the second mode of operation. Although not shown, the door carrier 5 may support a track or rail assembly of the type known and used in the industry. This arrangement permits the slide door 4 and pillar 9 to slide along the door carrier 5 to a final, fully open, extended position as shown in FIGS. 3 and 6. The sliding movement of the slide door 4 and pillar 9 is generally transverse, but at a slight angle, to a plane of the access opening 4*a*.

In FIG. 4, the slide lever 8 is shown as including a base 8*a* mounted on the door frame 10 and a handle 8*b* extending from the base. The slide lever 8 is coupled to the catch slide 25 by a conventional latching mechanism (not shown) for selectively holding the catch slide in a locked position (shown in FIGS. 1, 2, 4 and 5) and releasing the catch slide for movement to an unlocked position (FIGS. 3 and 6).

As shown in FIG. 6, the catch slide 25 includes an elongated body portion that extends along the door frame 10, and is also movably secured to the frame. At a front end of the elongated body portion, the catch slide 25 defines a notch 15, the center pillar catch, that abuts one end of the center pillar 9 to help secure and properly position the center pillar 9 within the door frame 10. Also, at a rear end of the catch slide 25 there is defined a hook-shaped notch 26, the catch pitch pole notch, that secures the pitch pole 7 as described in more detail below.

Within the body portion of the catch slide 25, there are formed elongated guide openings 22 and 23, as best seen in FIGS. 4 and 5, that extend along a longitudinal axis of the catch slide. Guide pins 19 and 24 are secured in and travel within the respective openings 22 and 23. A shorter guide opening 21 extends parallel and adjacent to the guide opening 22. A chuck pin 20 movably couples one end of the pitch pole 7 in the opening 21.

As best seen in FIG. 5, the pitch pole 7 is an elongated member having one end that is pivotally secured in the opening 21 by the chuck pin 20. An opposite end of the pitch pole 7 is pivotally coupled to the door carrier 5 by a pin connection 18. As best seen in FIG. 1, when the slide door 4 is closed, the opposite end of the pitch pole 7 with the pin 18 rests in the hook-shaped notch 26 defined by the catch slide 25.

Additionally, the slide mechanism C includes mechanisms that permit the center pillar 9 to be movably coupled to the catch slide 25. As best seen in FIG. 4, when the slide door 4 is in the closed position, a forward end 27 of the center pillar 9 abuts an auxiliary strike 17 positioned adjacent to the pivot door carrier 16, wherein the auxiliary strike 17 serves as a position locator for the center pillar 9.

Referring to FIG. 6, a rearward end 28 of the center pillar 9 supports a strike pin 14. When the center pillar 9 is in the normal position, i.e., acting as a load-bearing member, the strike pin 14 rests in the center pillar catch 15 defined in the catch slide 25.

As best seen in FIG. 4, the center pillar 9 is coupled to the slide door 4 via the center hinge 3. The center hinge 3 includes a center hinge mount 13 that is secured to the slide door 4 and a center hinge base 12 that is supported by the center pillar 9. Cooperation among the slide lever 8, the catch slide 25 and the movable center pillar 9 allows the access openings 1*a* and 4*a* formed by the doors 1 and 4 respectively to be consolidated so as to create an access opening larger than that formed by either of the two access openings. The following description details the operation of the slide mechanism C.

Operation of the Slide Mechanism

To open the slide door 4 and move the center pillar 9 in the second mode of operation, the swing door 1 must be fully open. Once the swing door 1 is fully open and the slide door 4 is unlatched, the slide lever 8 can be actuated. Actuation of the slide lever 8 causes the catch slide 25 to slide in the direction of the rear of the vehicle V. This action causes the catch center pillar notch 15 to slide away from the center pillar 9, thus, releasing the strike pin 14 of the center pillar 9. This action also causes the pitch pole 7 to rotate up and out of the pitch pole catch 26.

As the pitch pole 7 rotates up, the door carrier 5 rotates about the pivot door carrier 16. When the pitch pole 7 has been rotated to its outermost position, the door carrier 5 will also have been rotated to a sliding position, a position that aligns the door carrier 5 at an angle to the side of the vehicle V. In this position, the door carrier 5 establishes a suitable clearance between the slide door 4 and the vehicle body to permit the slide door 4 to move back and forth along the vehicle body without hitting the vehicle body. Preferably, the pivot door carrier 16 is configured to permit control over how far the slide door 4 rotates out from the vehicle body. For example, if the slide door 4 is allowed to rotate out too far, the slide door may inadvertently strike persons or objects near the exterior of the slide door. Likewise, too small a rotation about the pivot door carrier 16 may result in the slide door 4 striking the body of the vehicle in which it is installed, thus preventing or at least interfering with the slide capability of the slide door. Once the door carrier 5 is in the slide position, the center pillar 9 and the slide door 4 can be pushed toward the rear of the vehicle to a fully extended position, thus creating a larger access opening in the frame 10.

Figure 7:
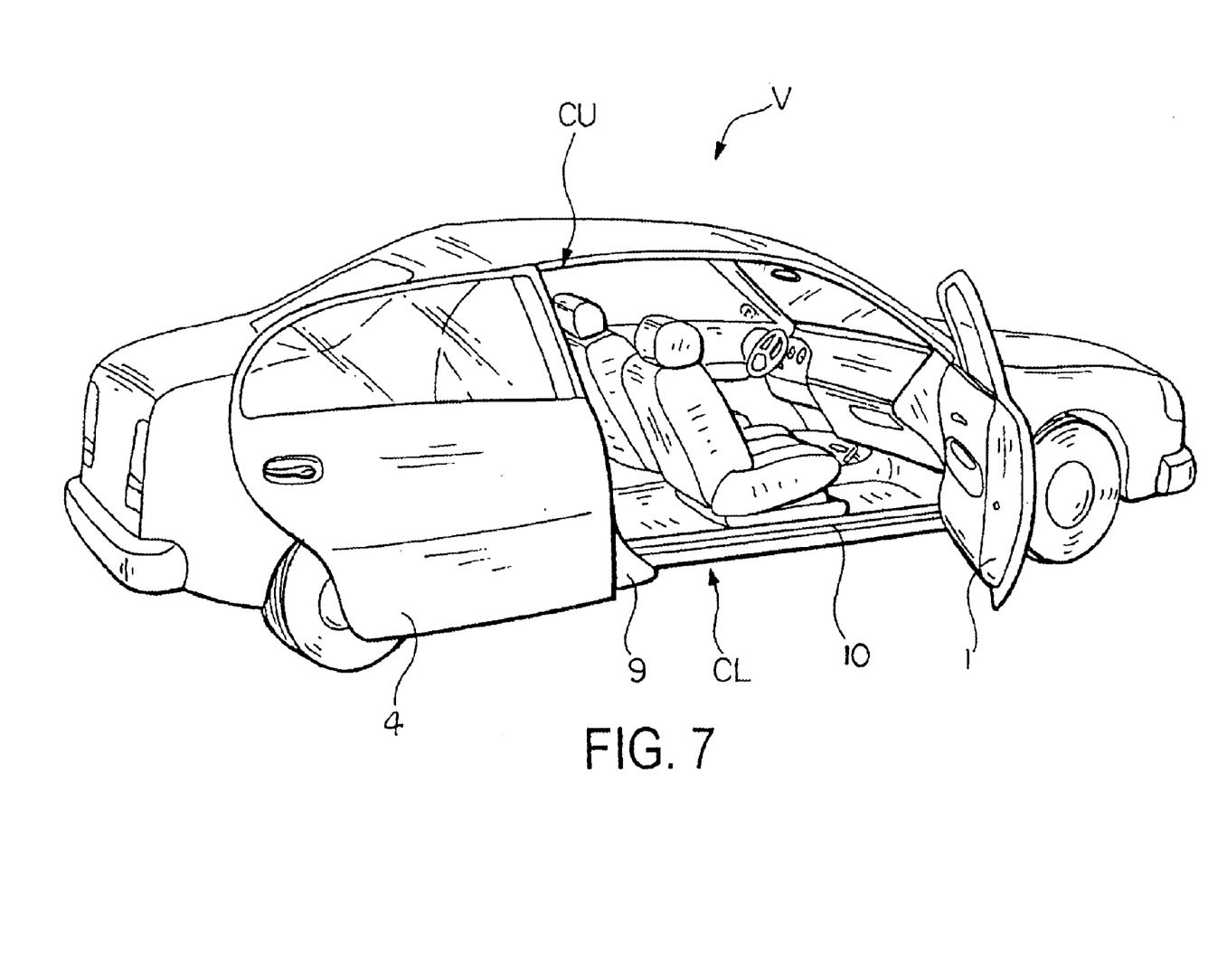
FIG. 7 is a side elevation view of the vehicle of FIG. 1 with the front swing door fully open and the rear slide door and the structural member in the fully extended position shown in FIG. 6.

There is shown in FIG. 7, the vehicle V having the swing door 1 fully open and the assembly of the slide door 4 with the center pillar 9 in the rearward position creating a maximum size access opening. The slide mechanism C described above is implemented as a lower slide mechanism CL attached at the bottom of the door frame 10 and a similar upper slide mechanism CU attached at the top of the door frame. While the slide mechanisms CL and CU have the same components as the slide mechanism C, the upper slide mechanism does not have to be as robust since it is not supporting the weight of the slide door 4 and the center pillar 9. As shown in FIG. 6, the door carrier 5 is coupled to the door frame 10 at the front end by a pivot door carrier 16. The pivot door carriers 16 of the slide mechanisms CL and CU provide two pivot points, one located at or near the roofline of the vehicle V and the other at or near the base of the door frame 10, about which the door carriers 5 rotate with the slide door 4 and the center pillar 9.

The slide mechanism C (CL, CU) has been described with reference to a four-door automobile with the door frame 10 having the center pillar 9. However, it will be appreciated that the slide mechanism C can be incorporated into any structure, including but not limited to, a building, an airplane, a boat, a ship or any other similar device. It will also be appreciated that the slide mechanism may be used in conjunction with a hatch type door as well as a pivot door of the type described herein.

Figure 8:
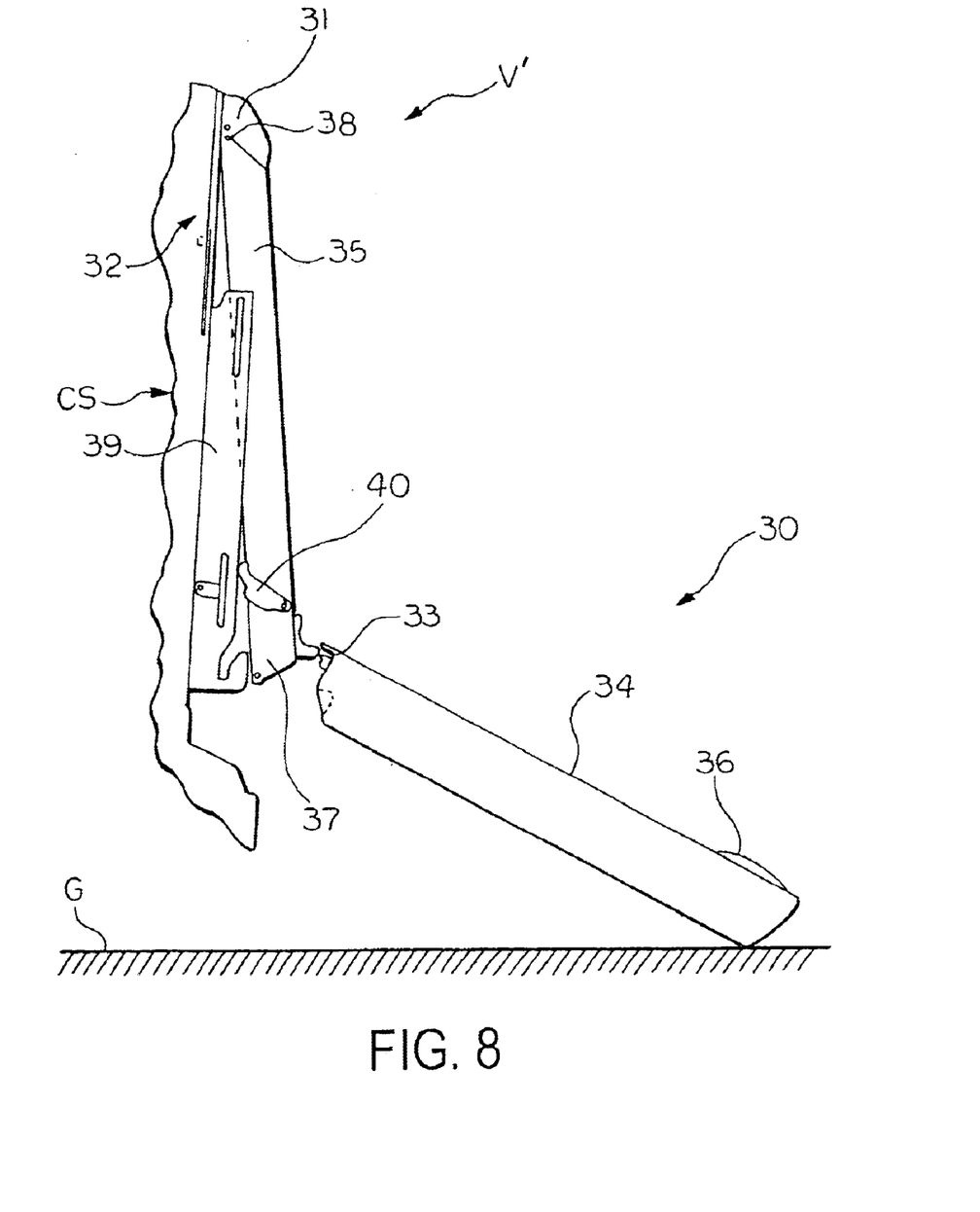
FIG. 8 is a fragmentary side elevation view of another embodiment of the present invention wherein the slide door also functions as a ramp.

For example, there is shown in FIG. 8 a vehicle V' having a slide door/ramp assembly 30 supported in a door frame 31 defining an access opening 32. The assembly 30 is attached to a side slide mechanism CS similar to the slide mechanism C, but installed in a vertical orientation. The slide mechanism CS is representative of two such mechanisms, one connected at either side of the assembly 30. A hinge 33 rotatably connects a hatch door 34 to a structural member such as a header 37 extending horizontally across the rear of the vehicle V'. The hatch door 34 has a handle 36 for operation of the door in the first mode wherein the header 37 is positioned at the top of the opening 32 and the door pivots outwardly and upwardly about the hinge 33.

A door carrier 35 is pivotally attached to the door frame 31 by a pivot door carrier 38 and cooperates with a catch slide 39 through a pitch pole 40. After the header 37 is released from attachment to the door frame 31, in a manner similar to the operation of the slide mechanism C described above, the door carrier 35 swings to the position shown in FIG. 8 and the assembly of the header with the hatch door 34 slides downwardly to a ground surface G. The sliding movement is generally transverse, but at an angle, to a plane of the access opening 32. The hatch door can be pivoted on the hinge 33 to assume the position shown wherein a lower end of the hatch door rests on the ground G and the hatch door can function as a ramp. If desired, a cover (not shown) can be placed on the upwardly facing outer surface of the hatch door 34 to protect the finish and/or any window installed therein.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A door system comprising:
    a door frame defining an access opening and having a releasably attached structural member defining an edge of said access opening;
    a door pivotally attached to said structural member for a first mode of operation swinging between a closed position covering said access opening and a fully open position exposing said access opening; and
    a slide mechanism supporting said structural member and said door and being pivotally secured to said door frame, said slide mechanism being selectively operable in a second mode of operation for pivoting outwardly from said access opening and moving said structural member and said door out of said access opening.

2. The door system according to claim 1 wherein said slide mechanism includes a door carrier pivotally secured to said door frame upon which said structural member and said door are slidably mounted.

3. The door system according to claim 2 wherein said door carrier has an end pivotally attached to said door frame for pivoting said structural member and said door out of said closed position.

4. The door system according to claim 1 wherein said slide mechanism includes a pair of door carriers pivotally secured to said door frame at opposed positions and upon which said structural member and said door are slidably mounted.

5. The door system according to claim 1 wherein said slide mechanism includes a catch slide attached to said door frame and movable between a locked position holding said structural member and said door to permit said first mode of operation and an unlocked position releasing said structural member and said door to permit said second mode of operation.

6. The door system according to claim 1 wherein said structural member is one of a center pillar extending vertically between a front swing door access opening and said access opening for said door and a header extending horizontally at a top of said access opening for said door.

7. A vehicle comprising:
    a vehicle body having a door frame mounted thereon, said door frame defining an access opening and having a releasably attached structural member defining an edge of said access opening;
    a door pivotally attached to said structural member for a first mode of operation swinging between a closed position covering said access opening and a fully open position exposing said access opening; and
    a slide mechanism supporting said structural member and said door and being pivotally secured to said door frame, said slide mechanism being selectively operable in a second mode of operation for pivoting outwardly from said door frame and moving said structural member and said door out of said access opening.

8. The vehicle according to claim 7 wherein said slide mechanism includes a door carrier having an end pivotally secured to said door frame upon which said structural member and said door are slidably mounted.

9. The vehicle according to claim 7 wherein said slide mechanism includes a pair of door carriers pivotally secured to said door frame at opposed positions and upon which said structural member and said door are slidably mounted.

10. The vehicle according to claim 7 wherein said slide mechanism includes a catch slide attached to said door frame and movable between a locked position holding said structural member and said door to permit said first mode of operation and an unlocked position releasing said structural member and said door to permit said second mode of operation.

11. The vehicle according to claim 7 wherein said structural member is one of a center pillar extending vertically between a front swing door access opening and said access opening for said door and a header extending horizontally at a top of said access opening for said door.

12. A door system comprising:
    a door frame defining an access opening and having a releasably attached structural member defining an edge of said access opening;
    a door pivotally attached to said structural member for a first mode of operation swinging between a closed position covering said access opening and a fully open position exposing said access opening; and a pair of spaced apart slide mechanisms supporting said structural member and said door and being pivotally secured to said door frame, said slide mechanisms being selectively operable in a second mode of operation for pivoting outwardly from said access opening and moving said structural member and said door out of said access opening.

13. The door system according to claim 12 wherein said slide mechanism includes a door carrier pivotally secured to said door frame upon which said structural member and said door are slidably mounted.

14. The door system according to claim 13 wherein said door carrier has an end pivotally attached to said door frame for pivoting said structural member and said door out of said closed position.

15. The door system according to claim 12 wherein said slide mechanism includes a pair of door carriers pivotally secured to said door frame at opposed positions and upon which said structural member and said door are slidably mounted.

16. The door system according to claim 12 wherein said slide mechanism includes a catch slide attached to said door frame and movable between a locked position holding said structural member and said door to permit said first mode of operation and an unlocked position releasing said structural member and said door to permit said second mode of operation.

17. The door system according to claim 12 wherein said structural member is one of a center pillar extending vertically between a front swing door access opening and said access opening for said door and a header extending horizontally at a top of said access opening for said door.

* * * * *